United States Patent [19]

Inoue et al.

[11] Patent Number: 4,617,591
[45] Date of Patent: Oct. 14, 1986

[54] CHROMA SCANNING CIRCUIT FOR USE IN BEAM INDEX TYPE COLOR PICTURE REPRODUCING APPARATUS

[75] Inventors: Fumio Inoue, Yokohama; Masahiro Eto, Fujisawa; Takashi Kubota, Mito, all of Japan

[73] Assignee: Hitachi, Ltd., Tokyo, Japan

[21] Appl. No.: 689,005

[22] Filed: Jan. 4, 1985

[30] Foreign Application Priority Data

Jan. 9, 1984 [JP] Japan ................................ 59-896

[51] Int. Cl.⁴ .......................................... H04N 9/24
[52] U.S. Cl. ............................................ 358/67
[58] Field of Search ............................ 358/67, 74

[56] References Cited

U.S. PATENT DOCUMENTS

| | | | |
|---|---|---|---|
| 3,893,165 | 7/1975 | Sunstein | 358/67 |
| 4,261,010 | 4/1981 | Isono | 358/67 |
| 4,527,192 | 7/1985 | Midland | 358/67 |

FOREIGN PATENT DOCUMENTS 53-149723 12/1978 Japan .
54-96926 7/1979 Japan .
57-87686 6/1982 Japan .

Primary Examiner—Michael A. Masinick
Attorney, Agent, or Firm—Antonelli, Terry & Wands

[57] ABSTRACT

Disclosed is a chroma scanning circuit used in a beam index type color picture reproducing apparatus, the circuit being provided with an inductance element connected in series to a horizontal deflection coil, and a scanning signal generation circuit connected to a junction between the horizontal deflection coil and the inductance element. The impedance between the junction and the earth at the chroma scanning frequency is increased by the inductance element to thereby make a chroma scanning signal generated from the chroma scanning signal generation circuit flow easily in the horizontal deflection coil.

15 Claims, 9 Drawing Figures

CHROMA SCANNING CIRCUIT FOR USE IN BEAM INDEX TYPE COLOR PICTURE REPRODUCING APPARATUS

The present invention broadly relates to a color picture reproducing apparatus of the beam index type, and particularly to a chroma scanning circuit for use in a color picture reproducing apparatus of the beam index type.

A color picture reproducing apparatus of the beam index type reproduces a color picture by using a single electron beam. Such a color picture reproducing apparatus of the beam index type employs a picture tube having a fluorescent face structure constituted by color phosphor stripes disposed perpendicularly to the scanning direction of an electron beam and index phosphor stripes disposed with a certain relation to the color phosphor stripes.

Figure 1:
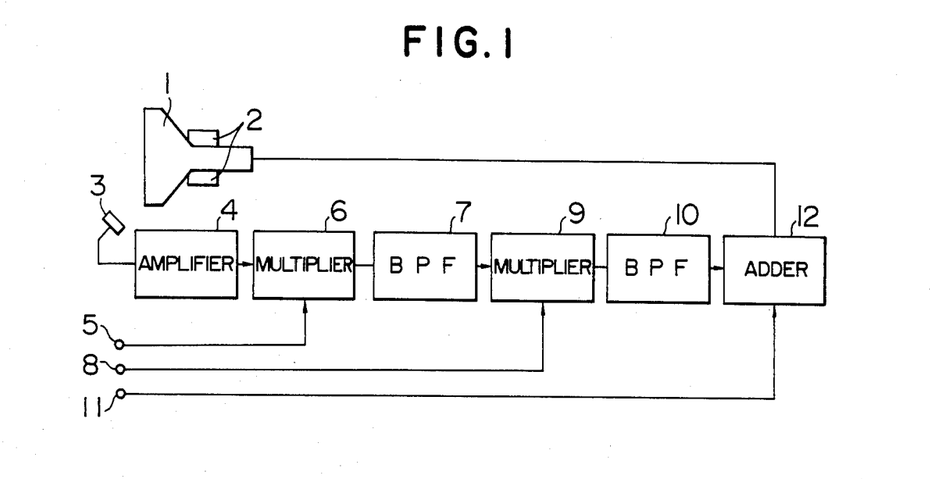
FIG. 1 is a block diagram showing the construction of a signal processing circuit of the beam index type.

Referring to FIG. 1, an ordinary beam index tube drive circuit of the color picture reproducing apparatus of the beam index type will be described in detail. The beam index type drive circuit is constituted by a photoelectric converter 3 for receiving an optical index signal emitted from a beam index tube 1, an amplitude limit amplifier 4 connected to the photo-electric converter 3, a multiplier 6 connected at its one input terminal to the amplitude limit amplifier 4, a signal line and its input terminal 5 which is connected to the other input terminal of the multiplier 6 and to which a chrominance subcarrier signal $f_{sc}$ is applied, a band-pass filter 7 connected to an output terminal of the multiplier 6, a second multiplier 9 connected to an output terminal of the band-pass filter 7 and to a carrier chrominance signal line connected to a terminal 8, a second band-pass filter 10 connected to the multiplier 9, and an adder 12 connected to an output terminal of the filter 10 for adding an output signal of the filter 10 and a lumunance signal supplied from a terminal 11 and for applying its output to the beam index tube 1.

The electron beam of the beam index tube 1 is deflected by a magnetic field generated by a horizontal-vertical deflection coil 2 and scanned on a fluorescent face. By this electron beam scanning, an optical index signal is emitted from the index phosphor applied on the fluorescent face and converted into an electric signal by the photo-electric converter 3. Further, in the amplitude limit amplifier 4, the amplitude of the index signal is always limited at a predetermined value, the frequency of this index signal being $f_i$. This index signal ($f_i$) and the chrominance subcarrier signal (the frequency is $f_{sc}$) applied to the terminal 5 are supplied as input signals to the multiplier 6. The output signal of the multiplier 6 is composed of a sum component ($f_i + f_{sc}$) and a difference component ($f_i - f_{sc}$) of the two input signal frequencies, and for example, only the sum component ($f_i + f_{sc}$) signal is taken out by the band-pass filter 7. Then, the output signal of the band-pass filter 7 and the carrier chrominance signal applied to a terminal 8 (the frequency is $f_{sc} \pm \Delta f$ and each of the phase and amplitude has color information) are supplied to the second multiplier 9 as the input signals thereto. Similarly to the above-mentioned multiplier 6, the output signal of the second multiplier 9 is composed of a sum component ($f_i + 2f_{sc} \pm \Delta f$) and a difference component ($f_i \pm \Delta f$) of the two input signals and only the difference component signal having a frequency suitable for driving the beam index tube 1 is taken out by the second band-pass filter 10.

Thus, a chrominance signal for driving an index tube is formed. The chrominance signal and the luminance signal applied to the terminal 11 are added by the adder 12 to thereby form an index tube drive signal. The index tube drive signal is supplied to a cathode of the index tube 1.

Depending on the structure of the fluorescent face, there is a case where, for example, a frequency multiplier, or the like, is disposed between the amplitude limit amplifier 4 and the multiplier 6. It is not necessary, however, to provide such a frequency multiplier in the case where the fluorescent face is constructed such a manner that, as shown in FIG. 1, the period of time for scanning a set of tri-color phosphors of red, green and blue is equal to the period of the index signal.

The color picture reproducing apparatus of the beam index type using a single electron gun can employ an electron beam condenser lens of a large diameter when compared with a color picture reproducing apparatus of the shadow mask type using three electron guns for emitting three colors, red, green and blue, in the case where the respective cathode ray tubes are equal in neck diameter to each other, so that an accurately focussed picture can be reproduced. Further, since the utility efficiency of the electron beam is high, it is possible to reduce power consumption. However, the color picture reproducing apparatus of the beam index does not use a shadow mask, and there is such a disadvantage that a reproduced color picture with a sufficiently high colorimetric purity is hardly obtained.

Figure 2:
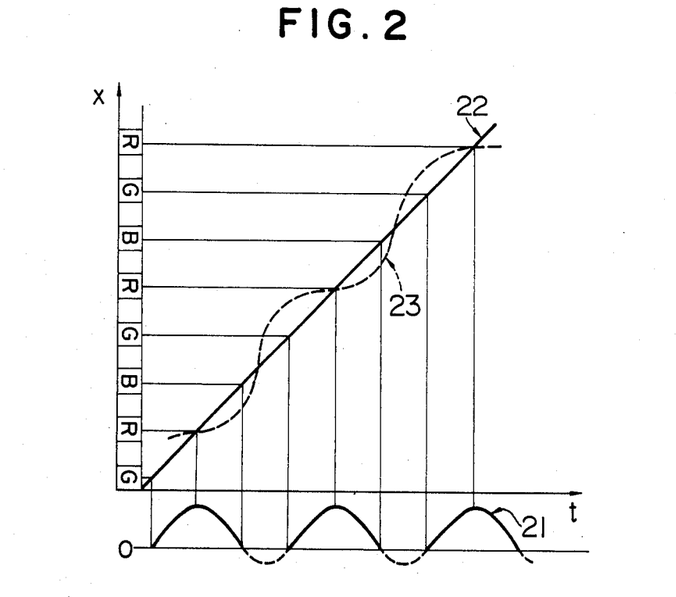
FIG. 2 is a waveform diagram explaining the state of scanning of an electron beam on a fluorescent face in the case where chroma scanning performed.

As one measure to eliminate the above-mentioned defect, there has been proposed a so-called chroma scanning method as disclosed, for example, in Japanese Patent Application Laid-open No. 96925/1979, 8768/1982, or the like. Referring to FIG. 2, the basic principle of the chroma scanning method will be described. FIG. 2 shows a scanning state of an electron beam with the abscissa representing time and the ordinate representing the position on a fluorescent face, and a beam current waveform 21 in an index tube in reproducing red color. A straight line 22 shows a characteristic of an electron beam scanning state in a normal time where the chroma scanning is not applied. To reproduce red color, the amplitude of the beam current waveform 21 takes a maximum value in scanning the center of an R-phosphor and zero in scanning the center of each of G- and B-phosphors. In normal scanning, however, as apparent in FIG. 2, there is a case where a beam current does not become zero when a beam is scanning on a part of the G- and B-phosphors. Further, when the diameter of the beam becomes larger, the beam naturally scans on the G- and B-phosphors so that it is difficult to obtain sufficient color purity for a color picture.

As shown with a broken line 23 in FIG. 2, however, the scanning speed of an electron beam can be improved in reproducing color purity by being changed with an index tube drive signal.

That is, in reproducing red color, it is possible to improve in reproducing red color purity by making the scanning speed delay on the R-phosphor and haste on the G- and B-phosphors. In the case where other colors are reproduced, it is possible to improve in color purity if the scanning speed of an electron beam is made delay at a position where the beam current takes a maximum value.

Figure 3:
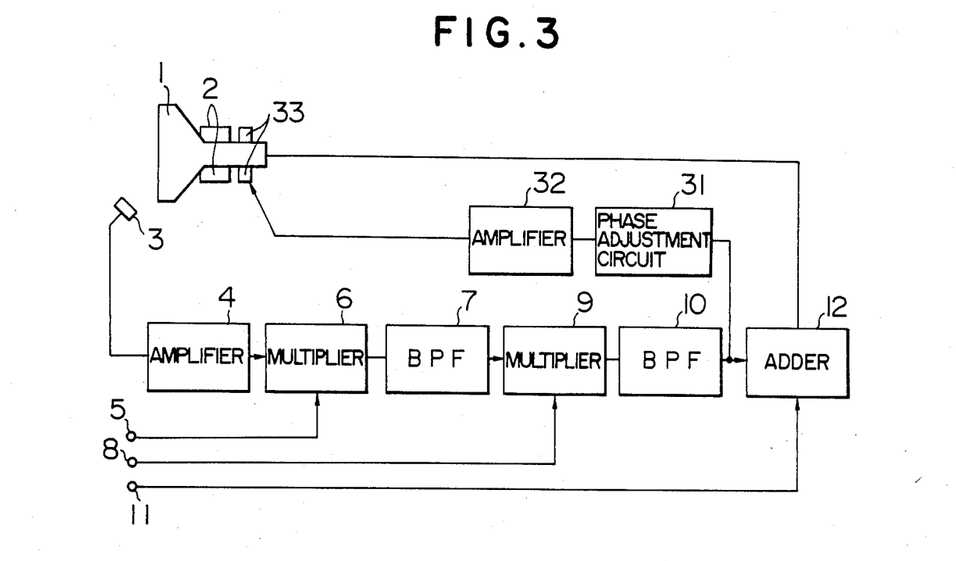
FIG. 3 is a block diagram of a signal processing circuit in the case where chroma scanning is performed by using a sub-deflection coil.

Such a construction as shown in FIG. 3 is known as a specific means for varying the scanning speed of an electron beam as shown with a broken line 23 in FIG. 2. In the circuit of FIG. 3, items corresponding to items in FIG. 1 are correspondingly referenced. In FIG. 3, an output signal of a second band-pass filter 10, from which an index type chrominance component is obtained, is applied to a chroma scanning sub-deflection yoke 33 provided adjacently to a horizontal/vertical deflection yoke 2 on a neck portion of an index tube through a phase adjustment circuit 31 and a power amplifier 32. The electron beam is finely deflected according to a change in magnetic flux generated in the sub-deflection yoke 33, and chroma scanning is performed in addition to the scanning of electron beam by a horizontal deflection yoke as shown with the broken line 23 in FIG. 2.

In the method using such a sub-deflection yoke 33 as shown in FIG. 3, there are disadvantages as follows:

When such a sub-deflection coil is mounted on the neck of an index tube, it is necessary to accurately adjust the mounting angle of the sub-deflection coil, and if the mounting angle is not suitable, it becomes impossible to obtain sufficient effect for improving the colorimetric purity.

Further, there is a significant disadvantage that since the sub-deflection coil 33 is disposed around an electric gun, the focussing electric field distribution of an electrostatic condenser lens is disturbed and the focusing performance of an electron beam is affected so that astigmatism is apt to occur on a beam. In the apparatus of the beam index type, a degree of chroma saturation falls when a beam spot diameter becomes large, so that the improvement effect by chroma scanning is cancelled and there is a risk of being made impossible to sufficiently accomplishing the original objects. Further, there are such problems that both the main deflection coil having a horizontal and a vertical deflection coil and a sub-deflection coil are constituted by coils, so that mutural interference between magnetic fields produced by the currents flowing through these coils to cause various disturbances, especially, reduction in deflection sensitivity of the main deflection yoke, etc.

An object of the present invention is therefore to provide a chroma scanning circuit of a beam index tube for performing chroma scanning (beam scanning speed modulation) without providing a sub-deflection coil.

The present invention is featured in that the intensity of a deflection magnetic field is varied to change the scanning speed of a beam by causing a current in which a chroma scanning current is superimposed on a horizontal deflection current to flow into a horizontal deflection coil of a beam index tube.

Generally, the impedance of a circuit connected across the opposite ends of the horizontal deflection coil becomes low when a horizontal output transistor or a damper diode becomes conductive, so that the chroma scanning current is hard to flow into the horizontal deflection coil even if a chroma scanning voltage is applied to either end of the horizontal deflection coil.

In a preferred embodiment, according to the present invention, a beam index tube deflection circuit is provided with an inductance element connected in series to a horizontal deflection coil, and a chroma scanning signal generation circuit connected to a junction between the horizontal deflection coil and the inductance element. The inductance element to which the output terminal of the chroma scanning signal generation circuit is connected always exhibits high impedance so that a chroma scanning current always flows from the chroma scanning signal generation circuit to the horizontal deflection coil.

In another preferred embodiment, according to the present invention, a deflection circuit of a beam index tube is provided with a transformer with its secondary winding connected in series to a horizontal deflection coil, and a chroma scanning signal generation circuit connected to the primary winding of the transformer. In this embodiment, a chroma scanning current is supplied to the primary coil of the transformer from the chroma scanning signal generation circuit and a current corresponding to the current flowing into the primary coil is induced to the secondary coil of the transformer so that this current also flows into a horizontal deflection circuit.

As described above, according to the present invention, it is possible to cause a chroma scanning current to flow into a horizontal deflection coil independently of the conductive state of an output transistor or a damper diode to thereby perform chroma scanning without using a sub-deflection coil.

Accordingly, it is possible to provide a color picture reproducing apparatus of the beam index type in which a chroma scanning effect can be obtained without accompanying the complex adjustment, a bad influence to the focusing characteristic of an electron beam, reduction in sensitivity of a horizontal/vertical deflection coil, differing from the case where a sub-deflection coil is employed. Further, since no sub-deflection coil is used, the manufacturing cost becomes inexpensive correspondingly.

As described above, the present invention relates to a chroma scanning circuits used in a color display apparatus of the beam index type.

Figure 4:
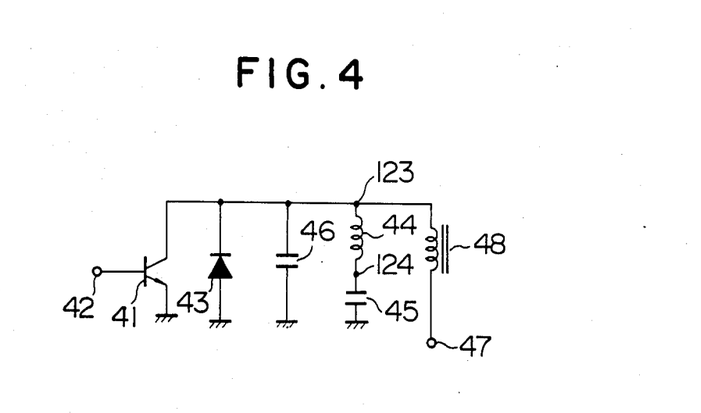
FIG. 4 is a circuit diagram showing construction of an ordinary horizontal output circuit.

FIG. 4 shows a circuit diagram of an ordinary horizontal deflection circuit. A collector of a horizontal output transistor 41 is connected to a cathode terminal of a damper diode 43 as well as one terminal of each of a resonance capacitor 46, a horizontal deflection coil 44 and a fly-back transformer 48. The other terminal of the horizontal deflection coil 44 is connected to one terminal of an S-curve correction capacitor 45. An anode terminal of the damper diode 43, an emitter of the horizontal output transistor 44, and the other end of each of the capacitors 45 and 46 are connected to the earth. The horizontal output transistor 41 is made conductive mainly in the later half of a scanning period by a drive signal applied from a terminal 42. The damper diode 43 is made conductive in the first half of the scanning period during which the transistor 41 is made non-conductive. The capacitor 46 is referred to as a resonance capacitor and energy stored in the deflection coil 44 during a fly-back period during which both the transistor 41 and the diode 43 are in their non-conductive state is supplied to the capacitor 46 by a resonance action. In order to compensate for losses occurring in a horizontal output circuit, energy is supplied thereto from a power supply terminal 47 through a choke inductance such as a flyback transformer 48, or the like.

Figure 5:
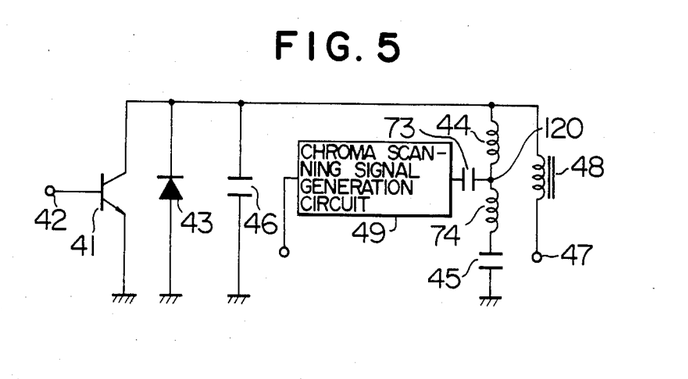
FIG. 5 is a circuit diagram of a first embodiment according to the present invention.

FIG. 5 shows a first embodiment according to the present invention. In the embodiment of FIG. 5, items corresponding to items in FIG. 4 are correspondingly referred.

A horizontal deflection coil 44 is connected in series to an inductance coil 74 (an inductance element) and a chroma scanning signal generation circuit 49 is connected to a junction point 120 between the horizontal deflection coil 44 and the inductance coil 74 through a capacitor 73 (an impedance element). In the thus arranged circuit, the impedance between the junction point 120 of the horizontal deflection coil 44 and the earth is higher due to existence of the coil 74 at a frequency of a chroma scanning signal and a chroma scanning current from the chroma scanning signal generation circuit 49 flows in the horizontal deflection coil 44 corresponding to the impedance ratio of the horizontal deflection coil 44 to the coil 74. Accordingly, an electron beam is deflected by a current in which the chroma scanning current is superimposed on a horizontal deflection current and it is made possible to perform chroma scanning slowly in scanning an aimed color phosphor while speedily in scanning the other color phosphor so that colorimetric purity is improved.

Figure 6:
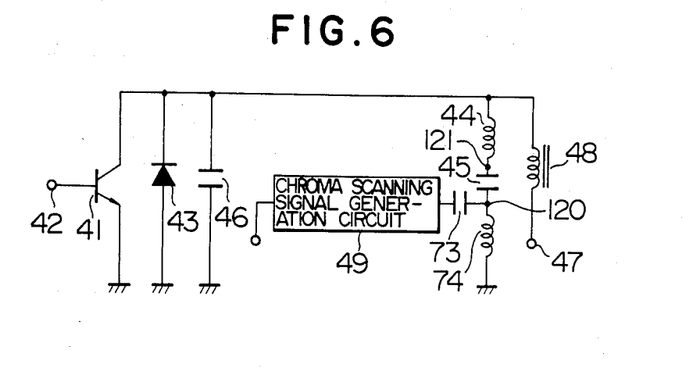
FIG. 6 is a circuit diagram showing a modification of the first embodiment according to the present invention.

FIG. 6 is a modification of the embodiment of FIG. 5. A coil 74 is connected across an S-curve correction capacitor 45 and the earth. In this embodiment, the same effect can be obtained by the same operation as in FIG. 5. Further, a chroma scanning current may flow into a horizontal deflection coil 44 even if the connection of a capacitor 73 which is now connected to a junction point 120 is changed from the junction point 120 to a junction point 121 between the horizontal deflection coil 44 and a capacitor 45. Further, in FIG. 5, the same effect can be obtained even in the case where the horizontal deflection coil 44 and the coil 74 is conversely disposed, if the withstand voltage of each of the coil 74 and the capacitor 73 is sufficiently large.

Next, referring to FIGS. 7 and 8, the above-mentioned first embodiment according to the present invention will be described in more detail.

Figure 7:
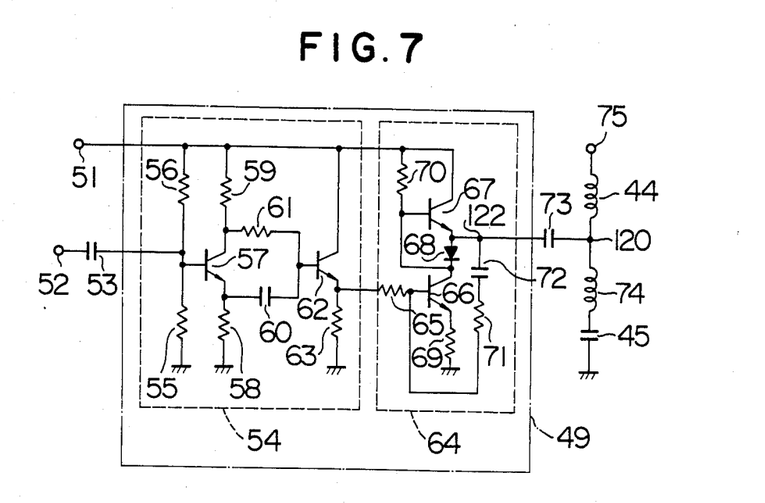
FIG. 7 is a specific circuit diagram of the first embodiment according to the present invention.

FIG. 7 shows a specific circuit embodiment of the chroma scanning signal generation circuit 49. In FIG. 7, power is supplied through a power supply terminal 51. An output signal of the second band-pass filter 10 in FIG. 3, that is, a chroma signal of an index type, is applied to a terminal 52 and hence supplied to a phase setting circuit 54 through a capacitor 53. The phase setting circuit 54 is constituted by bias resistors 55 and 56, a transistor 57, an emitter resistor 58, a collector resistor 59, a capacitor 60 whose one end is connected to the emitter of the transistor 57, a resistor 61 whose one end is connected to the collector of the transistor 57, a transistor 62 with its base connected to a junction point between the respective other ends of the resistor 61 and the capacitor 60 to operate as an emitter follower, and an emitter resistor 63. In the case where the resistance value of the resistor 58 is equal to that of the resistor 59 and a base input impedance of the transistor 62 is extremely high, the phase of the phase setting circuit 54 changes within 180 degrees by changing the time constant of the circuit constituted by the capacitor 60 and the resistor 61 while keeping the amplitude constant. Accordingly, if the resistor 61 is a variable one and the resistance value thereof is changed, the phase of the output signal may be desirably adjusted. In the case where the most suitable phase condition as a chroma scanning circuit can not be obtained within the above setting region of 180 degrees, it is advisable to use together with a proper phase shifter.

An amplifier 64 is constituted by a shunt regulated push-pull (SRPP) circuit. In particular, it is constituted by a resistor 65, transistors 66 and 67, a diode 68, resistors 69, 70 and 71, and the capacitor 72. Although a single ended push-pull (SEPP) circuit may be used as a B-class push-pull amplifier, the SRPP circuit is more preferable because it can be constituted by less number of transistors of the same conduction type. The resistor 71 and the capacitor 72 are used to form a feedback loop which is used for correcting waveform distortion at an output terminal 122 of the SRPP circuit. In the case where sufficient voltage gain can not be obtained by using only the SRPP circuit of FIG. 7, for example, other amplifier may be disposed between the phase setting circuit 54 and the amplifier 64.

The output terminal 122 of the amplifier 64 is connected through the capacitor 73 to the junction point 120 between the horizontal deflection coil 44 and the inductance coil 74 which are connected in series to each other. A terminal 75 represents the junction point between the horizontal deflection coil 44 and the horizontal output transistor 41 (FIG. 5). As is apparent from the arrangement and operations of the horizontal output circuit in FIG. 4, either the output transistor 41 or the damper diode 43 is being conductive during a scanning period. For this, the impedance of the output transistor 41 or the damper diode 43 becomes extremely low in comparison with that of the horizontal deflection coil 44 at a chroma scanning signal frequency. Further, the impedance of the S-curve correction capacitor 45 is extremely low in comparison with that of the deflection coil 44, at a junction point 124 between the deflection coil 44 and the S-curve correction capacitor 45. Thus, in the arrangement of FIG. 4, if a chroma scanning signal generation circuit is connected to the junction point 123 or 124, it is impossible to cause a sufficient chroma scanning current to flow into the horizontal deflection coil 44. In the present embodiment as shown in FIG. 7, however, since the horizontal deflection coil 44 is connected in series to the inductance coil 74, the impedance between the junction point 120 and the earth becomes higher by the amount of impedance of the inductance coil 74 at a chroma scanning signal frequency. Accordingly, a current of a chroma scanning signal flows into the horizontal deflection coil 44. That is, it becomes possible to improve reproducing colorimetric purity. The inductance value of the inductance coil 74 is selected to be about 1/30 to ½ of that of the horizontal deflection coil 44, considering an efficiency with which the chroma scanning signal current shunts to the horizontal deflection coil 44 and normal sensitivity of an ordinary horizontal deflection circuit. In the case where a horizontal linearity correction coil is used in the horizontal output circuit to which the present invention is applied, it will do to substitute the horizontal linearity correction coil for the inductance coil 74.

Here, the present embodiment is featured in that the capacitance value of the capacitor 73 is limited as follows. In an output circuit arrangement in the form of SRPP or SEPP used in an aural output circuit or a vertical output circuit, the capacitance value of the output capacitor 73 is made as large as possible while considering the shape and/or cost thereof. In the case of the present invention, however, a flyback pulse having an amplitude according to the inductance division ratio of the respective coils is generated at the junction point 120 between the horizontal deflection coil 44 and the inductance coil 74, so that the amplifier 64 may be destroyed or caused to operate incorrectly by the influence of the flyback pulse if the capacitance value of the capacitor 73 is comparatively large. Accordingly, in order to obtain proper circuit operations or an improvement effect in reproducing colorimetric purity, it will do to make the capacitance value of the capacitor 73 small.

Specifically, a time constant $\tau = \sqrt{LC}$, which is determined on the basis of a parallel inductance value L between the horizontal deflection coil 44 and the inductance coil 74 and the capacitance value C of the capacitor 73, has to be selected so as to satisfy the following relation with respect to a horizontal deflection frequency $f_H$:

$$\tau \leq \frac{1}{2\pi \times 6 f_H} \quad (1)$$

In the equation (1), the coefficient 6 of the horizontal deflection frequency $f_H$ is determined on the basis of the fact that the horizontal flyback period is commonly about 1/6 of a horizontal period.

Further, it is necessary to select the capacitance value C of the capacitor 73 is selected such that a chroma scanning signal can be supplied to the horizontal deflection circuit with a sufficient level and that the following limitation condition can be satisfied. That is, the capacitance value C of the capacitor 73 is selected so as to satisfy the following relation:

$$\tau \geq \frac{1}{2\pi \times 5 f_i} \quad (2)$$

where $f_i$ represents the chroma scanning signal frequency.

In the above equation, the coefficient 5 of the frequency $f_i$ is a value selected so as to take a proper mergin.

In the embodiment of FIG. 7, even in the case where the capacitance value of the capacitor 73 is selected to be extremely large and the time constant $\tau = \sqrt{LC}$ is beyond the scope of the limitation shown in the equations (1) and (2), a sufficient chroma scanning effect can be obtained if the capacitor 73 is connected in series to another impedance element, for example such as a resistor, and if the time constant $\tau = \sqrt{L/R}$ determined by the resistance value R and the parallel inductance value L between the horizontal deflection coil 44 and the inductance coil 74 can be substantially settled within the scope of limitation of the time constant expressed by the equations (1) and (2). In this case, an influence of the capacitance value of the capacitor 73 acting on the time constant $\tau$ is negligible because the capacitance of the capacitor 73 is sufficiently large. In the case where an average value of DC voltage applied across the opposite ends of the capacitor 73 is comparably small and a value of average DC current determined by the above-mentioned average DC voltage value and the resistance value R of the resistor connected between the terminals 120 and 122 instead of the capacitor C does not cause abnormal operations of the output amplification circuit 64 and the horizontal output circuit, it may be possible to short the capacitor 73 and to connect the output amplification circuit 64 to the horizontal output circuit only through a resistor.

Further, it will do to connect an inductance element in series with the capacitor 73 so as to absorb an influence of a horizontal flyback pulse.

Figure 8:
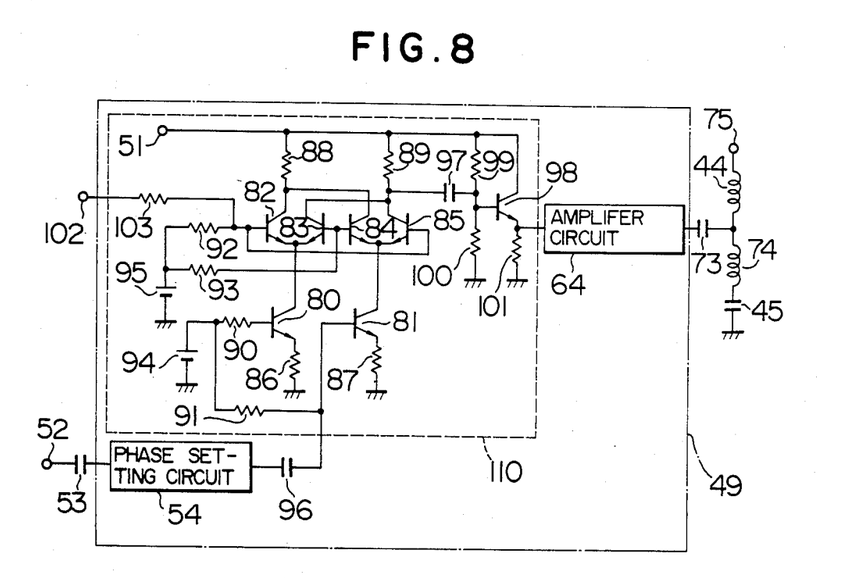
FIG. 8 is a specific circuit diagram of the second embodiment according to the present invention.

Referring to FIG. 8, now, a second embodiment according to the present invention will be described in detail. In the embodiment of FIG. 8, items corresponding to items in FIG. 7 correspondingly referenced. In FIG. 8, a full-balance type differential amplifier circuit 110 is disposed between a phase setting circuit 54 and an output amplifier 64 provided as a pre-amplifier for controlling the amplitude of the output amplifier 64. The full-balance type differential amplifier circuit 110 is constituted by transistors 80 and 85, resistors 86 to 93 and constant voltage sources 94 and 95, and the output signal of the phase setting circuit 54 is applied to the base of the transistor 81 through a capacitor 96. The output signal of the full-balance type differential amplifier circuit 110 is applied through a capacitor 97 to an emitter follower circuit constituted by a transistor 98 and resistors 99 to 101, as well as to the output amplifier 64. A control signal is applied to the respective base electrodes of the transistors 82 and 85 from a terminal 102 through a resistor 103 and controls the amplitude of the full-balance type differential amplifier circuit 110.

Generally, in a color picture reproducing apparatus of the beam index type, a degree of deterioration in chroma saturation in a reproduced picture is remarkable in the case of a high luminance level as compared with the shadow mask system. Accordingly, even in the case where colorimetric purity is improved by chroma scanning in the beam index system, it is desirable to control the quantity of micro deflection of an electron beam such that the quantity becomes smaller in the case of a low luminance level while larger in the case of a high luminance level.

On the basis of the above mentioned thought, a luminance component in the signal driving the index tube, that is the signal applied to the terminal 11 in FIG. 1, is applied to the terminal 102 in FIG. 8. In the full-balance type differential amplifier circuit in FIG. 8, however, the amplitude becomes larger as the voltage at the terminal 102 rises, and it is necessary that the luminance component applied to the terminal 102 have positive polarity in white and negative one in black. In the case where the polarity of a luminance signal is contrary to above, it is possible to cope with this by modifying the particular construction of the amplifier.

In the case of the beam index type apparatus, the darker a reproduced picture is, and the larger a chroma scanning effect is made, the more difficult to obtain a stable index signal is. According to the embodiment in FIG. 8, however, chroma scanning is performed in accordance with a luminance component, and there are advantages that the strictest condition to obtain a stable index signal is eased so as to facilitate stable chroma reproducing and improve the colorimetric purity at a necessary portion.

Figure 9:
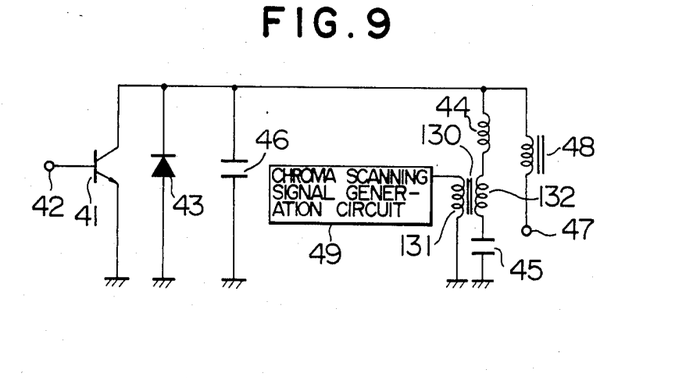
FIG. 9 is a circuit diagram of a third embodiment according to the present invention.

FIG. 9 shows a third embodiment according to the present invention. In this embodiment of FIG. 9 items corresponding to items in FIG. 5 correspondingly referenced. A chroma scanning signal generation circuit 49 is the same as that in FIGS. 7 or 8. According to the present embodiment, the coil 74 provided in series to the horizontal deflection coil in the first and second embodiments is substituted by the secondary winding 132 of a transformer 130 is connected in series to a horizontal deflection coil and the primary winding 131 of this transformer 130 is connected in series to the chroma scanning signal generation circuit.

In the thus arranged circuit, a current corresponding to a chroma scanning current flowing in the primary winding 131 of the transformer 130 is superimposed on a horizontal deflection current flowing in the secondary winding 132 of the same. Accordingly, the electron beam is caused to finely fluctuate by the chroma scanning current to thereby obtain a chroma scanning effect.

Also in the present embodiment, it is needless to say that the same effect can be obtained even if the disposition order of a horizontal deflection coil 44, the transformer 130 and an S-curve correction capacitor 45 is reversed. If the transformer 130 in this embodiment has such a characteristic that the impedance thereof is sufficiently high with respect to a low frequency and low with respect to a chroma scanning frequency, it is not necessary to provide a capacitor for preventing the chroma scanning signal generation circuit 49 from being destructed by an inflow of a flyback impulse as shown in FIG. 9, but if such a characteristic can not be obtained, it is necessary to provide such a capacitor 73 as shown in FIG. 5.

In the present embodiment, the entire current generated in the secondary winding 132 of the transformer 130 by the output of the chroma scanning signal generation circuit 49 flows in the horizontal deflection coil 44. The current which flows in the coil 74 in the first and second embodiments can be caused to flow also in the horizontal deflection coil.

Accordingly, there are advantages that the current supplied from the chroma scanning signal generation circuit 49 can be reduced in value and the chroma scanning signal generation circuit 49 can be reduced in size.

We claim:

1. A chroma scanning circuit used in a beam index type color picture reproducing apparatus having a deflection circuit provided with a horizontal output transistor, a horizontal deflection coil connected to an output of said horizontal output transistor, and a resonance capacitor connected to an output of said horizontal output transistor, and having an index tube in which a single electron beam is deflected by a horizontal deflection magnetic field generated by said deflection circuit, said chroma scanning circuit comprising:
   an inductance element connected in series to said horizontal deflection circuit;
   an impedance element connected at its one end to a junction between said horizontal deflection coil and said inductance element; and
   a chroma scanning signal generating means connected to the other end of said impedance element and for generating a chroma scanning signal.

2. A chroma scanning circuit according to claim 1, in which said impedance element includes a capacitor.

3. A chroma scanning circuit according to claim 2, in which the inductance value L of said inductance element and the capacitance value C of said capacitor are selected to satisfy the following condition with respect to the inductance value $L_H$ of said horizontal deflection coil.

$$\frac{L_H}{30} \leq L \leq \frac{L_H}{3}$$

and $$\frac{1}{2\pi \times 5f_i} \leq \sqrt{\frac{L \cdot L_H}{L + L_H} \cdot C} \leq \frac{1}{2\pi \times 6f_H}$$

4. A chroma scanning circuit according to claim 1, in which a time constant determined by a parallel impedance of said horizontal deflection coil and said inductance element, and an impedance of said impedance element satisfies the following condition with respect to the frequency $f_i$ of said chroma scanning signal.

$$\frac{1}{2\pi \times 5f_i} \leq \tau \leq \frac{1}{2\pi \times 6f_H}$$

5. A chroma scanning circuit according to claim 1, in which said chroma scanning signal generating means comprises:
   a phase setting circuit for receiving a chrominance signals to drive said index tube and for setting a phase of the chrominance signal;
   an amplifier circuit connected to an output of said phase setting circuit for amplifying an output signal from said phase setting circuit; and
   a control means connected to said amplifier circuit for controlling an amplitude of said amplifier circuit in accordance with a luminance level of a luminance signal for driving said index tube.

6. A chroma scanning circuit used in a beam index type color picture reproducing apparatus having a deflection circuit provided with a horizontal output transistor, a horizontal deflection coil connected to an output of said horizontal output transistor, and a resonance capacitor connected to an output of said horizontal output transistor, and having an index tube in which a single electron beam is deflected by a horizontal deflection magnetic field generated by said deflection circuit, said chroma scanning circuit comprising:
   a transformer with its secondary winding connected with said horizontal deflection coil; and
   a chroma scanning signal generating means connected with a primary circuit of said transformer for generating a chroma scanning signal.

7. A chroma scanning circuit according to claim 6, in which said chroma scanning signal generating means comprises:
   a phase setting circuit for receiving a chrominance signals to drive said index tube and for setting a phase of the chrominance signal;
   an amplifier circuit connected to an output of said phase setting circuit for amplifying an output signal from said phase setting circuit; and
   a control means connected to said amplifier for controlling an amplitude of said amplifier circuit in accordance with a luminance level of a luminance signal for driving said index tube.

8. A chroma scanning circuit used in a beam index type color picture reproducing apparatus having a deflection circuit provided with a horizontal output transistor, a horizontal deflection coil connected to an output of said horizontal output transistor, an S-curve correction capacitor connected to said horizontal deflection coil, and a resonance capacitor connected to an output of said horizontal output transistor, and having an index tube in which a single electron beam is deflected by a horizontal deflection magnetic field generated by said deflection circuit, said chroma scanning circuit comprising:

an inductance element connected in series between said horizontal deflection circuit and said S-curve correction capacitor;

an impedance element connected at its one end to a junction between said horizontal deflection coil and said inductance element; and a chroma scanning signal generating means connected to the other end of said impedance element and for generating a chroma scanning signal.

9. A chroma scanning circuit according to claim 8, in which said impedance element includes a capacitor.

10. A chroma scanning circuit according to claim 9, in which the inductance value L of said inductance element and the capacitance value C of said capacitor are selected to satisfy the following condition with respect to the inductance value $L_H$ of said horizontal deflection coil.

$$\frac{L_H}{30} \leq L \leq \frac{L_H}{3}$$

and $$\frac{1}{2\pi \times 5f_i} \leq \sqrt{\frac{L \cdot L_H}{L + L_H} \cdot C} \leq \frac{1}{2\pi \times 6f_H}$$

11. A chroma scanning circuit according to claim 8, in which a time constant determined by a parallel impedance of said horizontal deflection coil and said inductance element, and an impedance of said impedance element satisfies the following condition with respect to the frequency $f_i$ of said chroma scanning signal.

$$\frac{1}{2\pi \times 5f_i} \leq \tau \leq \frac{1}{2\pi \times 6f_H}$$

12. A chroma scanning circuit used in a beam index type color picture reproducing apparatus having a deflection circuit provided with a horizontal output transistor, a horizontal deflection coil connected to an output of said horizontal output transistor, an S-curve correction capacitor connected to said horizontal deflection coil, and a resonance capacitor connected to an output of said horizontal output transistor, and having an index tube in which a single electron beam is deflected by a horizontal deflection magnetic field generated by said deflection circuit, said chroma scanning circuit comprising:

an inductance element connected in series to said S-curve correction capacitor;

an impedance element connected at its one end to a junction between said horizontal deflection coil and said inductance element; and a chroma scanning signal generating means connected to the other end of said impedance element and for generating a chroma scanning signal.

13. A chroma scanning circuit according to claim 12, in which said impedance element includes a capacitor.

14. A chroma scanning circuit according to claim 13, in which the inductance value L of said inductance element and the capacitance value C of said capacitor are selected to satisfy the following condition with respect to the inductance value $L_H$ of said horizontal deflection coil.

$$\frac{L_H}{30} \leq L \leq \frac{L_H}{3}$$

and $$\frac{1}{2\pi \times 5f_i} \leq \sqrt{\frac{L \cdot L_H}{L + L_H} \cdot C} \leq \frac{1}{2\pi \times 6f_H}$$

15. A chroma scanning circuit according to claim 12, in which a time constant determined by a parallel impedance of said horizontal deflection coil and said inductance element, and an impedance of said impedance element satisfies the following condition with respect to the frequency $f_i$ of said chroma scanning signal.

$$\frac{1}{2\pi \times 5f_i} \leq \tau \leq \frac{1}{2\pi \times 6f_H}$$

* * * * *